United States Patent
Fincato

(10) Patent No.: US 9,461,769 B2
(45) Date of Patent: Oct. 4, 2016

(54) OPTICAL DEMULTIPLEXER AND METHOD OF CONTROLLING AN OPTICAL DEMULTIPLEXER

(71) Applicant: STMICROELECTRONICS S.R.L., Agrate Brianza (IT)

(72) Inventor: Antonio Fincato, Cameri (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/635,658

(22) Filed: Mar. 2, 2015

(65) Prior Publication Data
US 2015/0263819 A1    Sep. 17, 2015

(30) Foreign Application Priority Data
Mar. 12, 2014    (IT) .............................. MI2014A0387

(51) Int. Cl.
| H04J 14/00 | (2006.01) |
| H04J 14/02 | (2006.01) |
| G02B 6/12 | (2006.01) |
| G02B 6/293 | (2006.01) |
| G02F 1/21 | (2006.01) |

(52) U.S. Cl.
CPC ........... *H04J 14/02* (2013.01); *G02B 6/12007* (2013.01); *G02B 6/29352* (2013.01); *G02B 6/29395* (2013.01); *G02F 1/21* (2013.01); *H04J 14/00* (2013.01); *G02F 2001/212* (2013.01)

(58) Field of Classification Search
CPC ............... G02F 1/21; G02F 2001/212; G02B 6/12007; G02B 6/29352; G02B 6/29395; H04J 14/00; H04J 14/02
USPC ........................................................... 398/43
See application file for complete search history.

(56) References Cited

U.S. PATENT DOCUMENTS

| 6,185,345 B1* | 2/2001 | Singh ................. G02B 6/12007 385/14 |
| 2002/0118422 A1* | 8/2002 | Cao .................... H04B 10/2569 398/158 |
| 2004/0109220 A1* | 6/2004 | Han ................... H04B 10/2569 359/246 |
| 2006/0083144 A1* | 4/2006 | Piede ...................... G02F 1/025 369/100 |
| 2009/0028580 A1* | 1/2009 | Ojima .................. H04B 10/677 398/202 |

FOREIGN PATENT DOCUMENTS

JP    H06-130238    5/1994

* cited by examiner

*Primary Examiner* — Dalzid Singh
(74) *Attorney, Agent, or Firm* — Allen, Dyer, Doppelt, Milbrath & Gilchrist, P.A.

(57) ABSTRACT

An optical demultiplexer includes an interleaver with at least four ports including a first port adapted to receive the sum of two optical signals A and B, a second port and a third port respectively for signals A and B, and a fourth port. The optical demultiplexer further includes an optical component coupled to at least one of the two ports for signals A and B and configured to split the optical signal to be outputted into a weak intensity optical signal and a strong intensity optical signal.

20 Claims, 8 Drawing Sheets

OPTICAL DEMULTIPLEXER AND METHOD OF CONTROLLING AN OPTICAL DEMULTIPLEXER

FIELD OF THE INVENTION

The present disclosure relates to an optical demultiplexer and a method of controlling an optical demultiplexer.

BACKGROUND

Optical fiber transmission systems predominantly use predetermined "windows" (i.e. bands, channels) of the optical spectrum through which the transmission of the signals along the fibers takes place with a minimum attenuation. Signals or communication channels, each with its own precisely defined wavelength, as produced by a relevant laser generator, included in one of these privileged windows or bands modulable in intensity (commonly in digital or analog mode), may be transmitted along an optical fiber with extremely low losses. The simultaneous transmission of various communication channels belonging to a certain band, or window, or channel on a same fiber, is made possible by operating in Wavelength Division Multiplexing (WDM).

Mach-Zehnder interleavers are well-known devices suitable to realize the insertion or extraction of an optical signal or of a certain optical channel of a certain wavelength on an optical fiber carrying another optical signal or optical channel. With reference to the diagram in FIG. 1, a Mach-Zehnder interleaver may be schematically represented as composed of a first coupler (left side), whose structure is essentially that of two coupled optical paths (for example two waveguides), of an intermediate phase shifting stage suitable to determine a certain phase difference $\Delta\phi$ by means of a difference $n \cdot \Delta L$ of the optical path (where n is the refractive index and $\Delta L$ is the geometrical path difference) on the two branches of the device, and of a second coupler (right side).

The characteristic attenuation curve of a classic Mach-Zehnder interleaver is substantially of periodic type, as shown by way of example in FIG. 2, and is characterized by relatively selective peaks which are exploited to inject a certain frequency (wavelength centered to one of these peaks) in fiber and/or to extract it. Therefore a certain transmission system with optical fibers, operating with carrying signals with a wavelength included in the pass-band of a first channel or window, whose central or main wavelength is $\lambda_1$, may also support transmissions made in a second channel or window, whose central or main wavelength is $\lambda_2$. This result is obtained by determining the optical path difference $\Delta L$ so as the cross power transfer ratio $P_{LH-RL}$ from a first port (left-high, LH) to a third port (right-low, RL) is maximum at the wavelength $\lambda_2$ and practically null at the wavelength $\lambda_1$, and the parallel power transfer ratio $P_{LH-RH}$ from the first port (left-high, LH) to the second port (right-high, RH) is maximum at the wavelength $\lambda_1$ and practically null at the wavelength $\lambda_2$.

As shown in FIG. 1, Mach-Zehnder (MZ) interleavers can be used in both directions, either from left to right or vice versa, to separate (demultiplexer) two superposed optical signals applied at a same port or to superpose (multiplexer) two separated optical signals applied at two distinct ports, respectively. In both cases, in ideal functioning conditions the superposed (multiplexed) optical signals are available at the first port only and there is a fourth port (the left-low port LL in FIG. 1) at which there is not any optical signal in the shown configuration.

A plurality of MZ-interleavers MZ-1, MZ-2, MZ-3 may be coupled together as shown in FIG. 3 to implement an optical multiplexer/demultiplexer. An exemplary graphic representation of the four power transfer ratios P of the optical multiplexer/demultiplexer of FIG. 3 in function of the wavelength of input optical signals is depicted in FIG. 4.

In order to make MZ-interleavers work correctly, the optical path difference $n \cdot \Delta L$ of each interleaver is controlled using actuators, depicted as gray rectangles, for compensating eventual temperature fluctuations, tolerances of fabrication etc. To this end, as shown in FIG. 5, the fourth port of each MZ-interleaver may be coupled to a photo-detector PD. If the optical path difference $n \cdot \Delta L$ does not have the correct value to maximize the power transfer ratio at the normally used ports, then a nonnull optical signal is received at the fourth port revealing that the MZ-interleaver is not working in ideal conditions. The optical signals eventually sensed by the photo-detectors PD are converted into electric error signals provided as input to respective control blocks CONTROL that command the actuators (represented with gray rectangles) for adjusting the optical path differences of the MZ-interleavers.

Unfortunately, this control scheme cannot be implemented when the cascade of MZ-interleavers is used as an optical demultiplexer, as shown in FIG. 6, because no signal will ever be available on the normally unused ports.

SUMMARY

The embodiments are directed to an architecture of MZ-interleaver that may be used as a 1×2 optical demultiplexer, such as to be connected in cascade with other identical architectures to realize an optical demultiplexer configured to be controlled using photo-detectors.

The herein disclosed 1×2 optical demultiplexer comprises a MZ-interleaver with at least four ports including a first port for receiving the sum of two optical signals A and B, a second port and a third port, respectively, for the optical signals A and B, and a fourth port. Differently from the known MZ-interleavers, the 1×2 optical demultiplexer of this disclosure also comprises an optical component coupled to at least one of the two ports for the signals A and B for splitting the optical signal to be output (either A or B) into a weak optical signal and a strong optical signal.

According to an embodiment, the optical component is a partially reflective Bragg grating configured for back reflecting the weak optical signal throughout the MZ-interleaver towards the fourth port.

According to an embodiment, the optical component is a tap directional coupler, connected to the MZ-interleaver, having an input port configured to receive the optical signal to be split, a first output port configured to deliver the strong optical signal and a second output port configured to deliver the weak optical signal, and the 1×2 optical demultiplexer comprises a second MZ-interleaver identical to the other MZ-interleaver and connected in cascade thereto, configured to receive an input of the weak optical signal.

According to an embodiment, a $1 \times 2^N$ optical demultiplexer is obtained by coupling $2^N-1$ identical 1×2 optical demultiplexers according to a N-levels perfect binary tree architecture.

A method of controlling a 1×2 optical demultiplexer comprising a MZ-interleaver is also disclosed.

DETAILED DESCRIPTION

Figure 1:
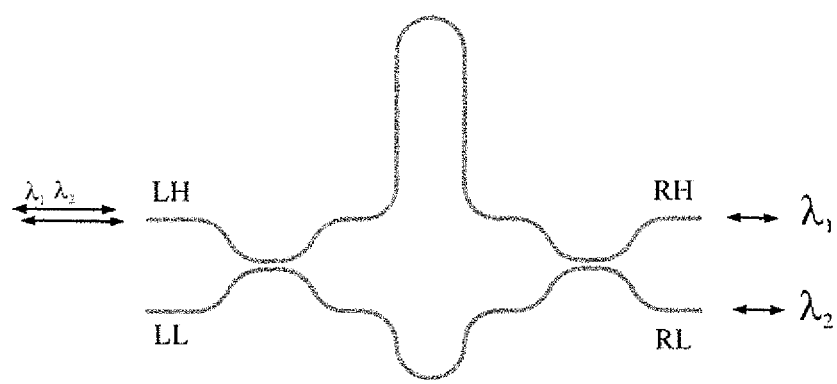
FIG. 1 illustrates a MZ-interleaver usable as an optical demultiplexer/multiplexer as in the prior art.
Figure 2:
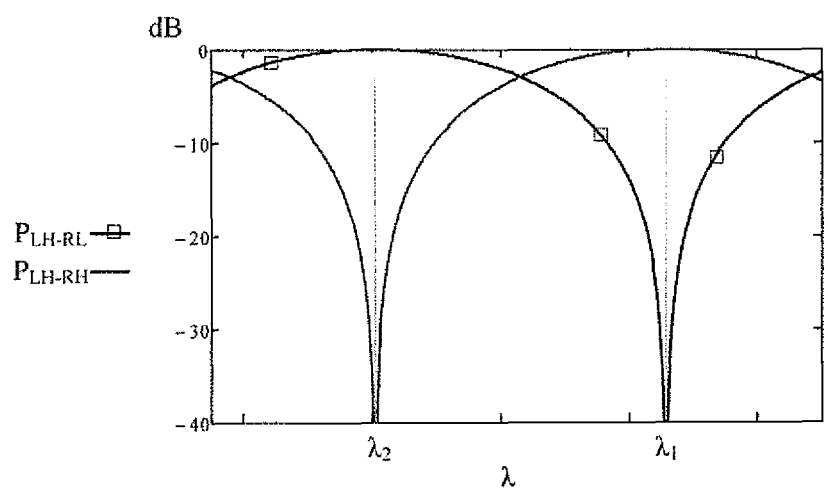
FIG. 2 graphically illustrates how the cross power transfer ratio $P_{LH-RL}$ and the parallel power transfer ratio $P_{LH-RH}$ of the 1×2 optical demultiplexer of FIG. 1 vary as a function of the wavelength of optical signals.
Figure 3:
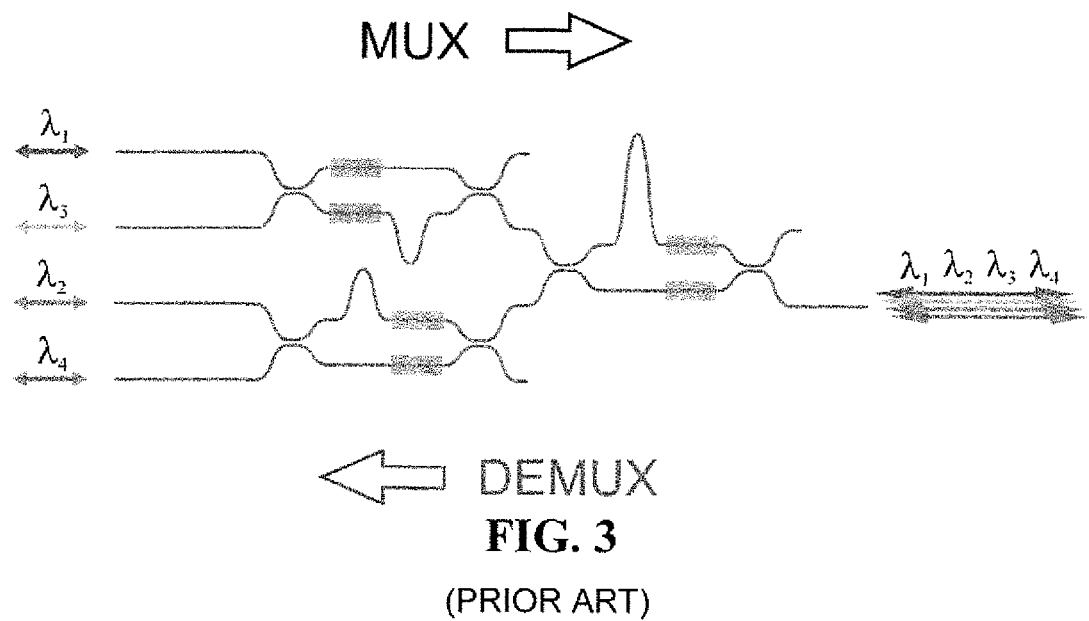
FIG. 3 shows an optical demultiplexer/multiplexer obtained by coupling three 1×2 optical demultiplexers among them according to a two-level perfect binary tree architecture as in the prior art.
Figure 4:
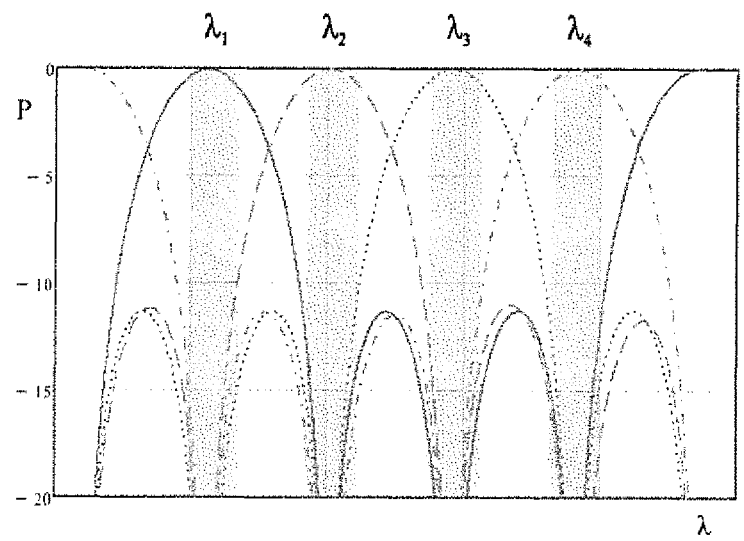
FIG. 4 graphically illustrates how the power transfer ratios P of the 1×4 optical demultiplexer of FIG. 3 vary in function of the wavelength of optical signals.
Figure 7:
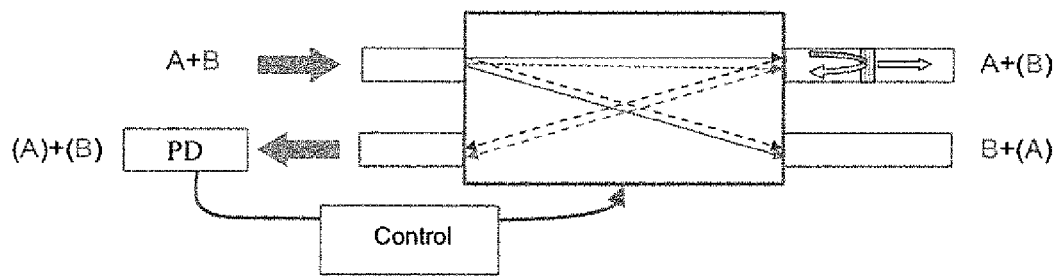
FIG. 7 schematically depicts an embodiment of the 1×2 optical demultiplexer of this disclosure with a partially reflecting grating installed in a port for back reflecting a weak optical signal throughout the MZ-interferometer towards the monitoring port thereof.
Figure 8:
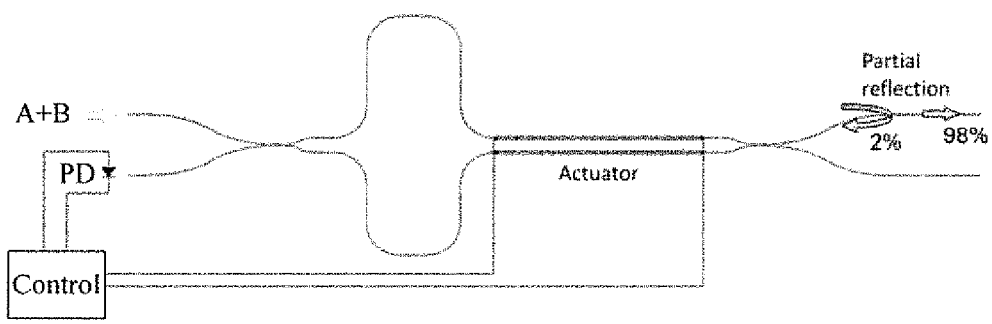
FIG. 8 illustrates in greater detail the 1×2 optical demultiplexer of FIG. 7.
Figure 9:
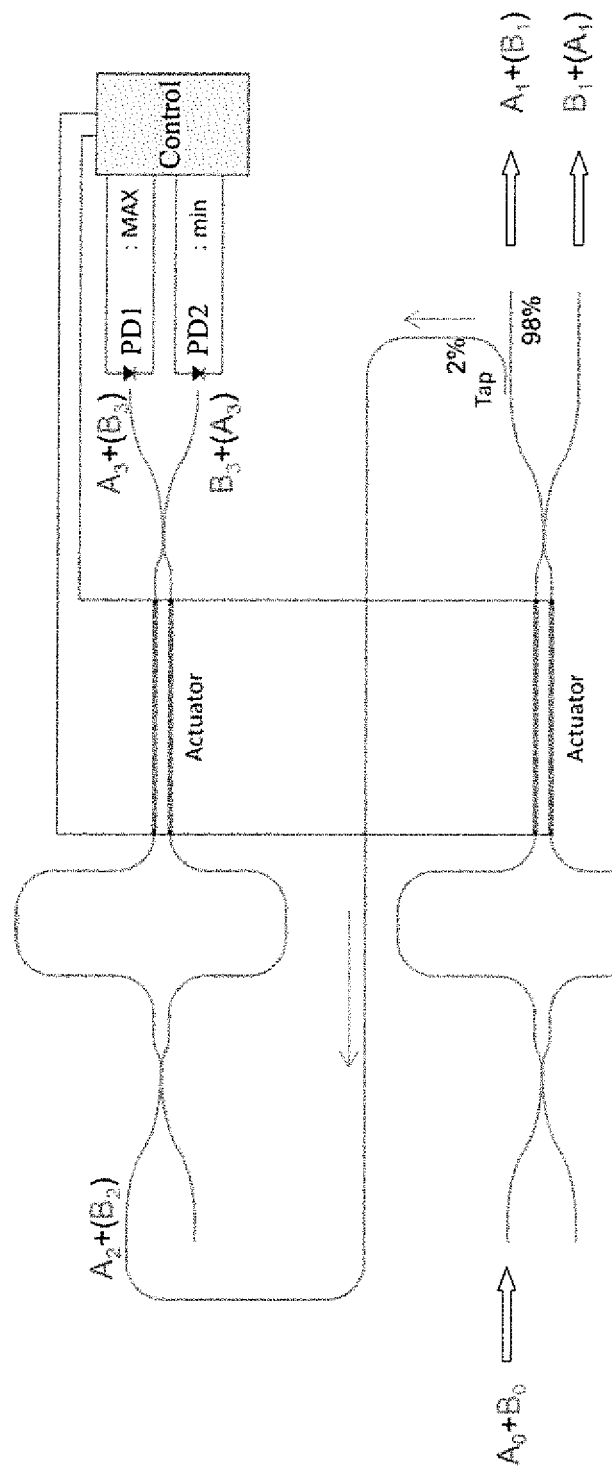
FIG. 9 schematically depicts another embodiment of the 1×2 optical demultiplexer of this disclosure composed of a first MZ-interferometer with a tap directional coupler and an identical second MZ-interferometer connected in cascade to the first MZ-interferometer.

Exemplary embodiments of the 1×2 optical demultiplexer of this disclosure are shown in FIGS. 7 to 9. They comprise at least a MZ-interleaver with a first port for providing an input of the sum A+B of a first optical signal A with a second optical signal B, a second port and a third port, respectively, for outputting the first optical signal A and the second optical signal B, and a fourth port for monitoring the functioning of the MZ-interleaver. Differently from the prior 1×2 optical demultiplexer of FIG. 1, it comprises an optical component installed in the second port or in the third port, i.e. the output ports of the demultiplexer, configured to split the optical signal available at this port into a weak intensity optical signal and a strong intensity optical signal.

In the shown embodiments, the intensities of the weak optical signal and of the strong optical signal are 2% and 98%, respectively, of the overall intensity of the optical signal A+(B) available at the second port, though different percentages may be established.

As schematically shown in FIG. 7, a 1×2 optical demultiplexer should separate the input signal A+B applied at a first port into a first optical signal at the wavelength A, made available at a second port, and a second optical signal at the wavelength B made available at a third port. Because of phase errors due to construction and temperature fluctuations, there is a cross-talk effect and a fraction (B) of the signal at the wavelength B may be present at the second port, at which only the first optical signal at the wavelength A was expected, and a fraction (A) of the signal at the wavelength A may be present at the third port, at which only the second optical signal at the wavelength B was expected.

According to the embodiment shown in FIGS. 7 and 8, the optical component installed in the second port is a partially reflective grating configured for generating the weak optical signal and back reflecting it through the MZ-interleaver towards the fourth port. The back reflected signal along the cross path from the second port to the fourth port results in a feedback optical signal (A)+(B) composed in practice of the sum of a fraction (2% in this example) of the crosstalk disturb (B) at the second port, that is capable of passing through the MZ-interleaver along the cross path from the second port to the fourth port without being attenuated, and a fraction (A) of the signal at the wavelength A present at the second port, that is strongly attenuated when passing through the MZ-interleaver along the cross path.

A similar result may be obtained if the optical component is coupled to the third port instead of the second port, as may be readily appreciated by the skilled reader. In both cases, only when the paths of the MZ-interleaver are not properly determined and thus, only when there is a cross-talk between the two output channels, a nonnull feedback optical signal (A)+(B) will be available at the fourth port. The feedback optical signal (A)+(B) may be sensed by a sensing device, such as for example a photo-detector PD, that generates a corresponding electric error signal. This error signal is provided to a control block CONTROL that commands an actuator configured to adjust the optical path difference of the MZ-interleaver in order to nullify or at least to minimize the feedback optical signal (A)+(B) or, equivalently, the electric error signal.

Figure 12:
FIG. 12 is a top view of an embodiment of a Bragg grating.
Figure 13:
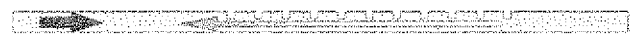
FIG. 13 is a side view of another embodiment of a Bragg grating.

A suitable partially reflective grating may be, for example, of the type shown in FIG. 12 or in FIG. 13. FIG. 12 shows a top view of a Bragg grating having a waveguide where the width having spatially periodic variations. FIG. 13 shows a Bragg grating having a waveguide where the thickness having spatially periodic variations obtained through an etching process.

According to the embodiment shown in FIG. 9, the optical component coupled to the second port is a tap directional coupler having an input port configured to receive the first optical signal A or the second optical signal B, respectively, a main output port configured to deliver the strong optical signal $A_1+(B_1)$, and an auxiliary output port configured to deliver the weak optical signal $A_2+(B_2)$. The 1×2 optical demultiplexer comprises a first Mach-Zehnder interleaver carrying the optical component, and a second Mach-Zehnder interleaver identical to the first one and connected in cascade thereto to receive an input of the weak optical signal $A_2+(B_2)$ at a corresponding first port. Also in this case, the intensities of the weak optical signal and of the strong optical signal are 2% and 98%, respectively, of the overall intensity of the optical signal available at the second port, though different percentages may be established.

The second MZ-interleaver connected downstream delivers the signals $A_3+(B_3)$ and $B_3+(A_3)$ at the second port and the third port, respectively. These signals may be converted by respective photo-detectors PD into corresponding electric error signals, provided as input to a control block CONTROL that commands the actuators that adjust the optical path difference of the MZ-interleavers. In the shown configuration, the optical signal sensed by the photo-detector PD1 at the second port will have a greater intensity (MAX) than the optical signal sensed by the photo-detector PD2 (min) at the third port because the tap directional coupler is coupled to the second port of the MZ-interleaver upstream.

Figure 5:
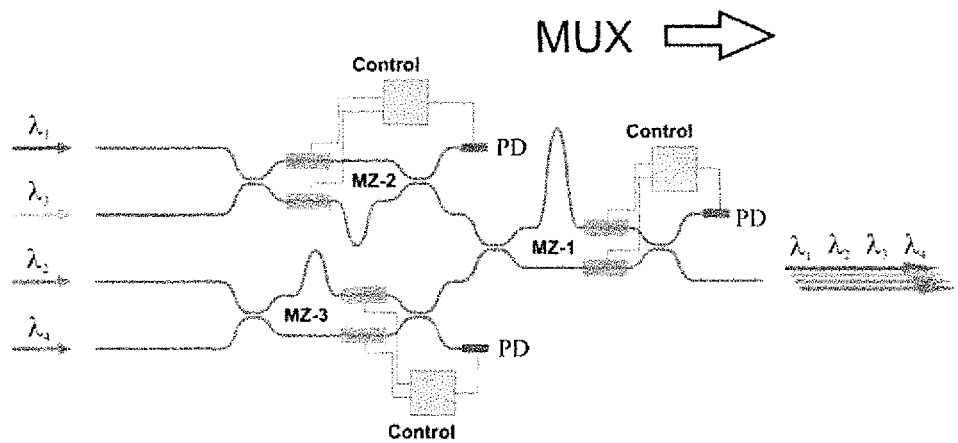
FIG. 5 shows how to connect photo-detectors PD and related control blocks for controlling the functioning of a 4×1 optical multiplexer of FIG. 3.
Figure 6:
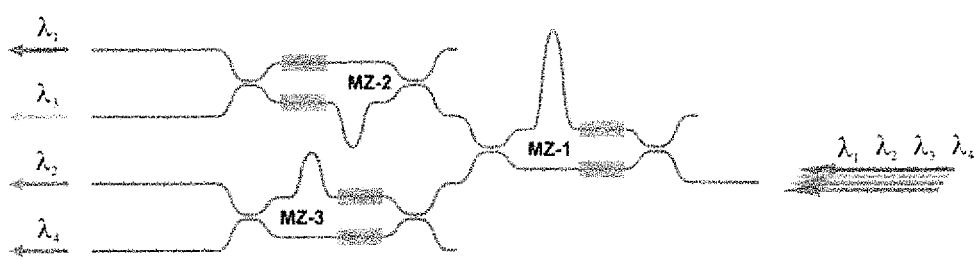
FIG. 6 shows why it is not possible to implement the functioning of a 1×4 optical demultiplexer of FIG. 3.

The 1×2 optical demultiplexers shown in FIGS. 7 to 9 increase the efficiency of separation of the optical sum signal A+B into its components at wavelength A and B. Moreover, they can also be operate as 2×1 optical multiplexers. Indeed, when used as 2×1 multiplexers, there is a nonnull optical signal at the fourth port, as explained above referring to FIG. 5. A photo-detector PD at the fourth port is already available in the embodiment of FIG. 7 or 8, thus this architecture may be indifferently used as a 1×2 optical demultiplexer or a 2×1 optical multiplexer. In the embodiment of FIG. 9, a further photo-detector should be added at the fourth port of the first MZ-interleaver connected upstream. This last embodiment may be conveniently used when application standards do not allow to introduce a back-reflection of optical signals.

According to an embodiment, the two MZ-interleavers of the 1×2 demultiplexer of FIG. 9 are identical and the control block adjusts the optical path differences of both MZ-interleaver in the same fashion in order to increase the intensity of the optical signal sensed by a photo-detector (PD1) and to reduce (nullify) the intensity of the optical signal sensed by the other photo-detector (PD2).

Using a plurality of 1×2 optical demultiplexer of FIG. 8 or 9 it is possible to realize optical demultiplexers of any order.

Figure 10:
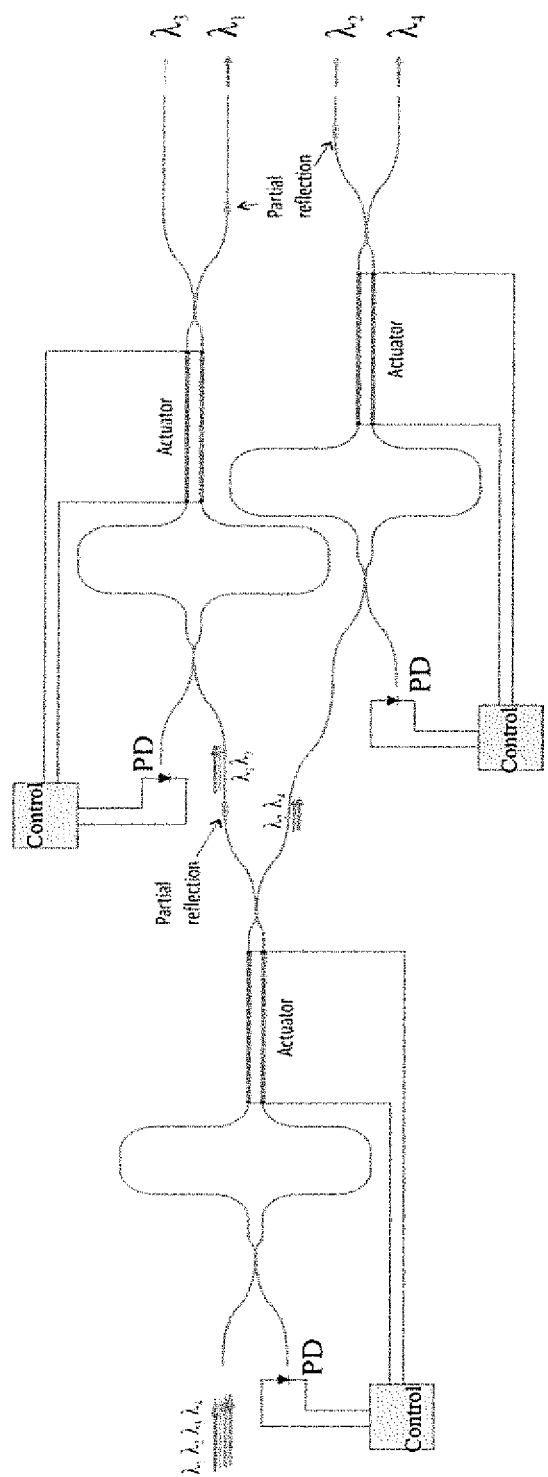
FIG. 10 shows an embodiment of a 1×4 optical demultiplexer of this disclosure obtained by coupling three similar 1×2 optical demultiplexers of FIG. 7 according to a two-levels perfect binary tree architecture.
Figure 11:
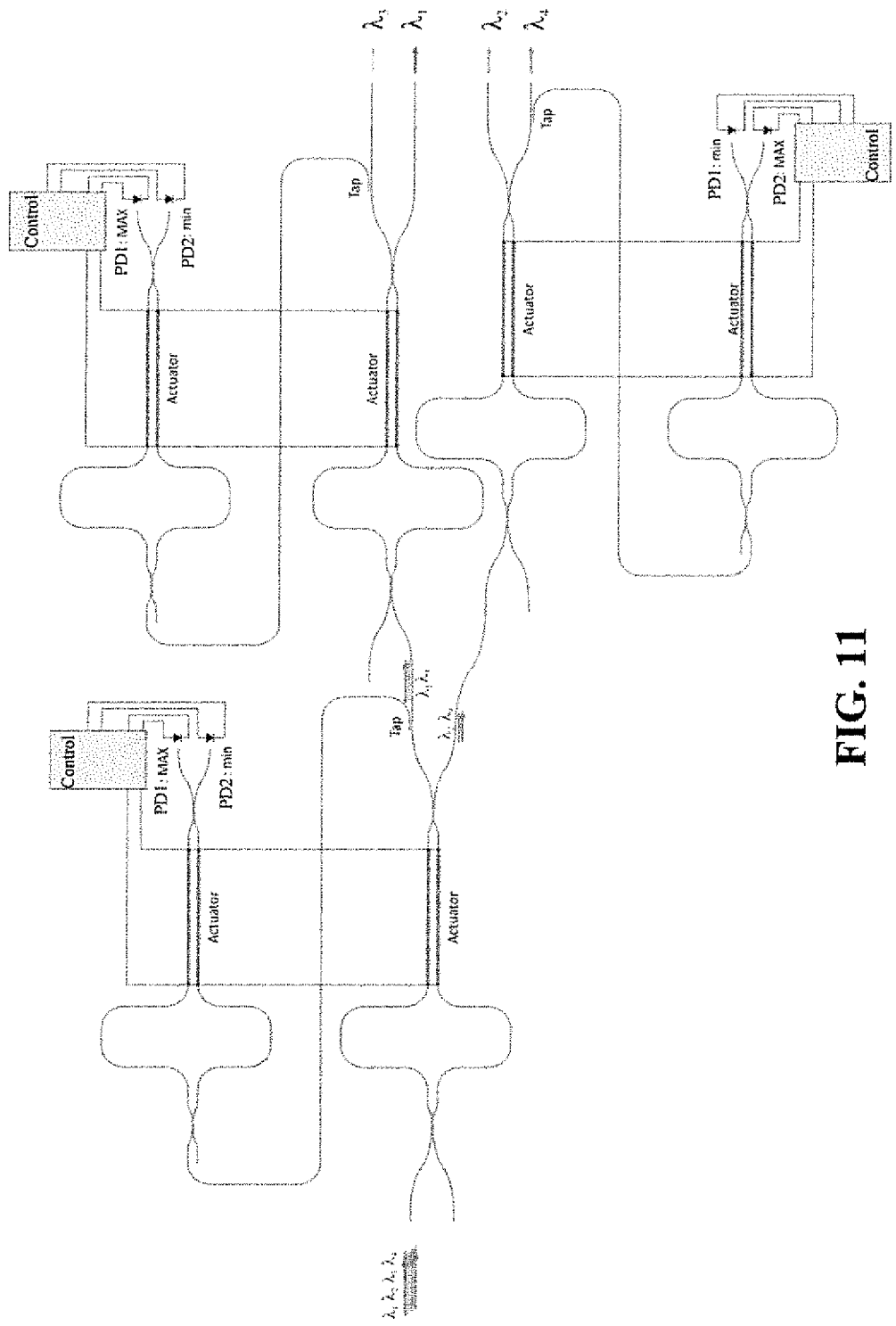
FIG. 11 shows an embodiment of a 1×4 optical demultiplexer of this disclosure obtained by coupling three similar 1×2 optical demultiplexers of FIG. 9 according to a two-levels perfect binary tree architecture.

Merely as an example, a 1×4 optical demultiplexer may be realized as shown in FIGS. 10 and 11 by coupling three identical 1×2 optical demultiplexers of FIGS. 8 and 9, respectively, according to a 2-levels perfect binary tree architecture. More generally, a $1 \times 2^N$ optical demultiplexer may be realized by coupling $2^N-1$ 1×2 optical demultiplexers of FIG. 8 or 9 according to an N-level perfect binary tree architecture.

The invention claimed is:

1. An optical demultiplexer comprising:
a Mach-Zehnder interleaver having a first port configured to receive an input of a sum of a first optical signal with a second optical signal, a second port configured to output the first optical signal, a third port configured to output the second optical signal, and a fourth port; and
an optical component coupled to the second port and configured to split the first optical signal into a weak intensity optical signal and a strong intensity optical signal;
said optical component configured to generate the weak intensity optical signal and back reflect it through said Mach-Zehnder interleaver towards the fourth port.

2. The optical demultiplexer of claim 1, further comprising:
an optical device configured to receive an input of said weak intensity optical signal and to generate at least a feedback optical signal;
a sensor configured to receive an input of said feedback optical signal and to generate a corresponding electric error signal;
an actuator controlled by a control signal and configured to adjust an optical path difference of said Mach-Zehnder interleaver; and
a control block configured to receive said electric error signal and to generate said control signal to reduce the feedback optical signal.

3. The optical demultiplexer of claim 2, wherein said sensor comprises a photo-detector coupled to said fourth port of said Mach-Zehnder interleaver and configured to receive an input of said feedback optical signal corresponding to a portion of said weak intensity optical signal.

4. The optical demultiplexer of claim 1, wherein said optical component comprises a partially reflective grating.

5. The optical demultiplexer of claim 1, wherein said optical component comprises a partially reflective Bragg grating.

6. An optical demultiplexer comprising:
a plurality of 1×2 optical demultiplexers coupled together according to a perfect binary tree architecture;
each optical demultiplexer of the plurality of 1×2 optical demultiplexers comprising:
a Mach-Zehnder interleaver having a first port configured to receive an input of a sum of a first optical signal with a second optical signal, a second port configured to output the first optical signal, a third port configured to output the second optical signal, and a fourth port; and
an optical component coupled to the second port and configured to split the first optical signal into a weak intensity optical signal and a strong intensity optical signal;
said optical component configured to generate the weak intensity optical signal and back reflect it through said Mach-Zehnder interleaver towards the fourth port.

7. The optical demultiplexer of claim 6, further comprising:
an optical device configured to receive an input of said weak intensity optical signal and to generate at least a feedback optical signal; and
a sensor configured to receive an input of said feedback optical signal and to generate a corresponding electric error signal.

8. The optical demultiplexer of claim 7, further comprising an actuator controlled by a control signal and configured to adjust an optical path difference of said Mach-Zehnder interleaver.

9. The optical demultiplexer of claim 8, further comprising a control block configured to receive said electric error signal and to generate said control signal to reduce the feedback optical signal.

10. The optical demultiplexor of claim 7, wherein said sensor comprises a photo-detector coupled to said fourth port of said Mach-Zehnder interleaver and configured to receive an input of said feedback optical signal corresponding to a portion of said weak intensity optical signal.

11. A method of controlling an optical demultiplexer comprising a Mach-Zehnder interleaver having a first port configured to receive an input of a sum of a first optical signal with a second optical signal, a second port configured to output the first optical signal, a third port configured to output the second optical signal, and a fourth port, the method comprising:
splitting the first optical signal into a weak intensity optical signal and a strong intensity optical signal;
generating a feedback optical signal from said weak intensity optical signal;

generating an electric error signal corresponding to said feedback optical signal;

adjusting an optical path difference of said Mach-Zehnder interleaver to reduce the electric error signal; and back reflecting the weak intensity optical signal through said Mach-Zehnder interleaver towards the fourth port.

12. The method of claim 11, further comprising using an optical component to generate the weak intensity optical signal and back reflect it through said Mach-Zehnder interleaver towards the fourth port.

13. The method of claim 12, wherein the optical component comprises a reflective grating.

14. The method of claim 12, wherein the optical component comprises a partially reflective Bragg grating.

15. An optical demultiplexer comprising:
a first Mach-Zehnder interleaver having a first port configured to receive an input of a sum of a first optical signal with a second optical signal, a second port configured to output the first optical signal, a third port configured to output the second optical signal, and a fourth port;
a tap directional coupler having an input port coupled to said first Mach-Zehnder interleaver to receive the first optical signal or the second optical signal, a main output port configured to deliver the strong intensity optical signal, and an auxiliary output port configured to deliver the weak intensity optical signal;
a second Mach-Zehnder interleaver identical to said first Mach-Zehnder interleaver and coupled in cascade thereto to receive an input at a corresponding first port of said weak intensity optical signal;
an optical device configured to receive an input of said weak intensity optical signal and to generate at least a feedback optical signal; and
photo-detectors coupled to the corresponding second and third ports of said second Mach-Zehnder interleaver and configured to generate respective electric error signals corresponding to portions of said weak intensity optical signal that travel through said second Mach-Zehnder interleaver from said first port to said second and third ports.

16. The optical demultiplexer of claim 15, further comprising:
a sensor configured to receive an input of said feedback optical signal and to generate a corresponding electric error signal; and
a control block configured to receive said electric error signal and to generate a control signal to reduce the feedback optical signal.

17. The optical demultiplexer of claim 16, wherein said second Mach-Zehnder interleaver having at least one actuator is configured to be controlled by said control block.

18. The optical demultiplexer of claim 17, wherein said control block is configured to receive said electric error signals and to adjust optical path differences of said first Mach-Zehnder interleaver and said second Mach-Zehnder interleaver.

19. A method of controlling an optical demultiplexer comprising a first Mach-Zehnder interleaver having a first port configured to receive an input of a sum of a first optical signal with a second optical signal, a second port configured to output the first optical signal, a third port configured to output the second optical signal, and a fourth port, the method comprising:
using a tap directional coupler to split the first optical signal into a weak intensity optical signal and a strong intensity optical signal;
receiving an input of said weak intensity optical signal at a second Mach-Zehnder interleaver identical to said first Mach-Zehnder interleaver and coupled in cascade thereto;
generating a feedback optical signal from said weak intensity optical signal;
generating an electric error signal corresponding to said feedback optical signal; and
adjusting an optical path difference of said first and second Mach-Zehnder interleavers to reduce the electric error signal.

20. The method of claim 19, wherein the tap directional coupler is coupled to the second port of the first Mach-Zehnder interleaver.

* * * * *